April 23, 1957 F. P. KEIPER, JR 2,790,033

TRANSISTOR AMPLIFIER CIRCUIT

Filed Oct. 29, 1953

INVENTOR.
FRANCIS P. KEIPER, JR.
BY
Allen V. Hazeltine
ATTORNEY

United States Patent Office 2,790,033

Patented Apr. 23, 1957

2,790,033

TRANSISTOR AMPLIFIER CIRCUIT

Francis P. Keiper, Jr., Elkins Park, Pa., assignor to Philco Corporation, Philadelphia, Pa., a corporation of Pennsylvania Application October 29, 1953, Serial No. 388,954

1 Claim. (Cl. 179—171)

Figure 1:
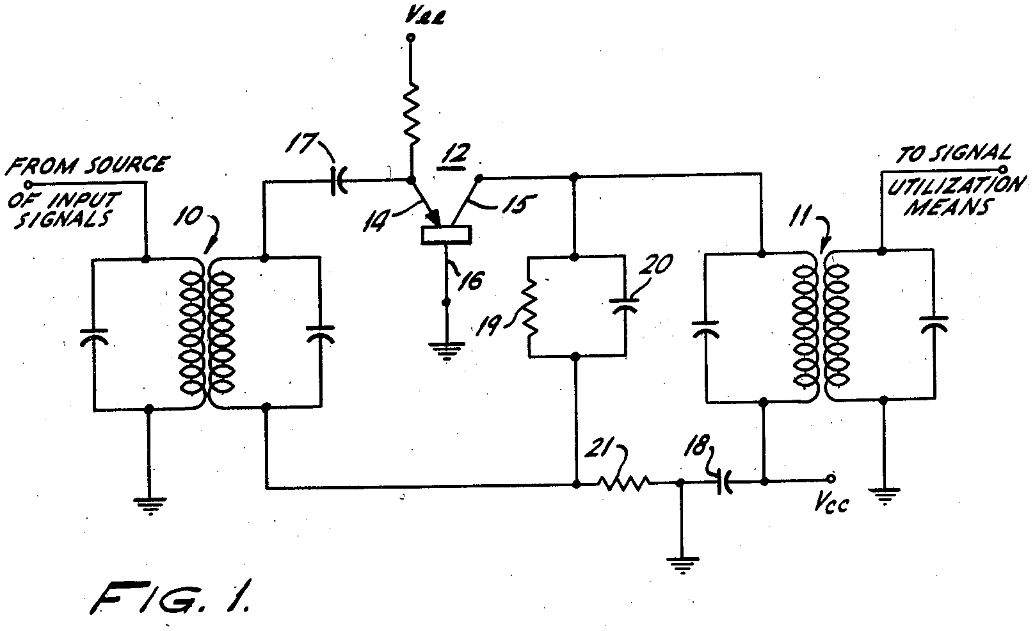

The invention relates to improvements in circuits utilizing semi-conductor amplifier elements, and more particularly to means for improving the impedance characteristics of such circuits.

The semi-conductor amplifier elements to which I have referred are devices which consist fundamentally of a body of semi-conductive material which is contacted by at least three separate electrodes. Usually, two of these electrodes have so-called rectifying characteristics, which means that they present much higher resistance to the flow of current in one direction through them than to the flow of current in the opposite direction, while the third electrode has so-called ohmic characteristics, which means that it presents substantially equal resistance to the flow of current in opposite directions therethrough.

It is now well known that such a semi-conductor amplifier element may take a number of physical forms. For example, it may consist of a comparatively large block of substantially homogeneous semi-conductor material which is provided with the aforementioned three electrodes. In this type of arrangement two of the electrodes are in the form of point contacts, made, for example, by sharpening to a point the ends of two wires and by applying these pointed ends at closely spaced points to the body of semi-conductor material. The remaining electrode may then be formed by plating on, or otherwise affixing to the same body a conductor having considerable surface area in contact with the body. In this form the point contact electrodes normally constitute the rectifying electrodes while the large area contact electrode constitutes the ohmic electrode. In another form the semi-conductor element may consist of a body of semi-conductor material having an excess of current carriers of one polarity, sandwiched between two bodies having an excess of current carriers of the opposite polarity. For example, the central body may be made of a so-called N-type semi-conductor material, which is characterized by having an excess of electrons, while the flanking bodies may be made of a so-called P-type semiconductor material which is characterized by having an excess of holes. It will be understood that my invention is also applicable to still other forms of such semi-conductor amplifier elements which are presently under investigation.

When one of the aforementioned rectifying electrodes is biased in the forward direction by the application of a suitable unidirectional potential between this electrode and the ohmic electrode, and when the other rectifying electrode is simultaneously biased in the reverse direction by the application of a suitable potential between this latter rectifying electrode and the ohmic electrode, then variations in the current supplied to the forwardly biased electrode, such as might be produced by an alternating potential applied between this electrode and the ohmic electrode, will modify the intensity of the current flowing between the ohmic electrode and the reversely biased rectifying electrode. Furthermore, comparatively small variations in the supplied current can produce very pronounced changes in this current, thus giving rise to the amplification characteristics of such a semi-conductor element.

It will be understood that an alternating input signal can be applied not only between the aforementioned forwardly biased and ohmic electrodes but between any pair of the aforementioned electrodes and that, in each case, an output signal corresponding roughly in form, although not usually in amplitude, to the input signal can be derived by means of a load connected between any other pair of electrodes. Naturally, different input and output connections are suitable for different applications of the amplifier element.

In this connection it is noted that the forwardly biased rectifying electrode of a semi-conductor element of the kind under consideration is conventionally known as the emitter electrode, while the reversely biased electrode is known as the collector electrode and the ohmic electrode is known as the base electrode. The various electrodes will therefore be designated by this conventional nomenclature in the discussion which follows.

It has been found that, regardless of which particular input and output connection is used, there always take place certain effects which can be accounted for most readily if it is assumed that some portion of the output signal is fed back to the input circuit and is thus effectively reapplied to the element. This feedback effect has several undesired consequences. First, the output signal is now produced not only in response to the desired input signal but also in response to the fed-back signal, thus giving rise to undesired components in the output signal. Secondly, the presence of an extraneous signal in the input circuit modifies the effective input impedance which is presented to the source of input signals. When, as is frequently the case, the element is being used in an amplifier network wherein the input signal is developed across a resonant circuit, then the aforementioned impedance variations due to feedback will change the effective impedance of this resonant circuit and with it the frequency response characteristic of the amplifier.

With certain arrangements of input and output connections, the consequences of this internal feedback are even more drastic, as it may produce undesired regeneration, culminating in overloading and destruction of the element.

Prior attempts to solve the foregoing problems have generally involved either the modification of the structure of the semi-conductor element in such a manner as to reduce the influence of those of its inherent characteristics which cause the aforementioned interaction, or the connection of external circuit elements between the input and output terminals of the semi-conductor element so as to feed back to the input terminals a portion of the output signal with such amplitude and polarity as to cancel out the signal which is fed back internally. Neither of these approaches has been notably successful, the first because it has hitherto proved impractical to build a semi-conductor amplifier element which has no appreciable internal feedback without also destroying some of its amplifying properties, and the second because certain internal parameters of the semi-conductor element, which are involved in the internal feedback path, are subject to variation in response to variations in the input signal, so that compensation by means of an external feedback path can be obtained, at best, only at a single value of signal amplitude.

It is accordingly a primary object of the invention to provide an amplifying circuit including a semi-conductor amplifier element, the circuit being so constructed that undesired interaction between the output and input circuits of the semi-conductor element is substantially reduced.

It is another object of the invention to provide an amplifying circuit including a semi-conductor amplifier element, the circuit being so constructed that, by appropriate adjustment of the values of certain circuit parameters, undesired interaction between the output and input circuits of the semi-conductor element can be eliminated to any desired degree.

It is still another object of the invention to provide a semi-conductor amplifier element with such external circuit connections that the effect of internal feedback from its output electrodes to its input electrodes is substantially eliminated.

The foregoing objects, as well as others which will appear, are achieved in accordance with my invention by connecting two impedance elements in series between the same two electrodes of the semi-conductor amplifier element from which output signals are to be derived, and by supplying the input signal to this semi-conductor element, not between its remaining electrode and one of the aforementioned output electrodes, as has been the practice heretofore, but rather between this remaining electrode and the junction of the aforementioned two series connected impedance elements. I have found that, with such a circuit arrangement, the amount of internal feedback between the output terminals and the input terminals of the semi-conductor element is governed by the ratio of the impedance values of the two series connected impedance elements.

Before describing the relationship between this ratio of impedance values and the amount of feedback, it is deemed necessary to recall that, for the purposes of analyzing its operation, a semi-conductor amplifier element may be represented by its so-called equivalent circuit which has the form of three impedances joined together in a Y-connection. The unconnected ends of these impedances can then be considered respectively as representing the emitter, collector and base electrodes of the semi-conductor element. It is convenient to designate each of the three aforementioned impedances by the same name as the electrode at which it terminates. Thus there is, in the equivalent circuit, a so-called equivalent collector impedance, an equivalent base impedance, and an equivalent emitter impedance. In addition to the foregoing passive components, the equivalent circuit also comprises an active component which may be represented by a current generator connected in parallel with the equivalent collector impedance. I have found that internal feedback is substantially eliminated if the two aforementioned external impedance elements have values which are in the same ratio to each other as the equivalent internal impedances associated with the electrodes to which the external elements are respectively connected. To the degree that the two impedance ratios differ there will be increasing amounts of feedback. Accordingly, it becomes a simple matter to regulate the amount of feedback by providing external impedance elements having the appropriate impedance ratio.

Figure 2:
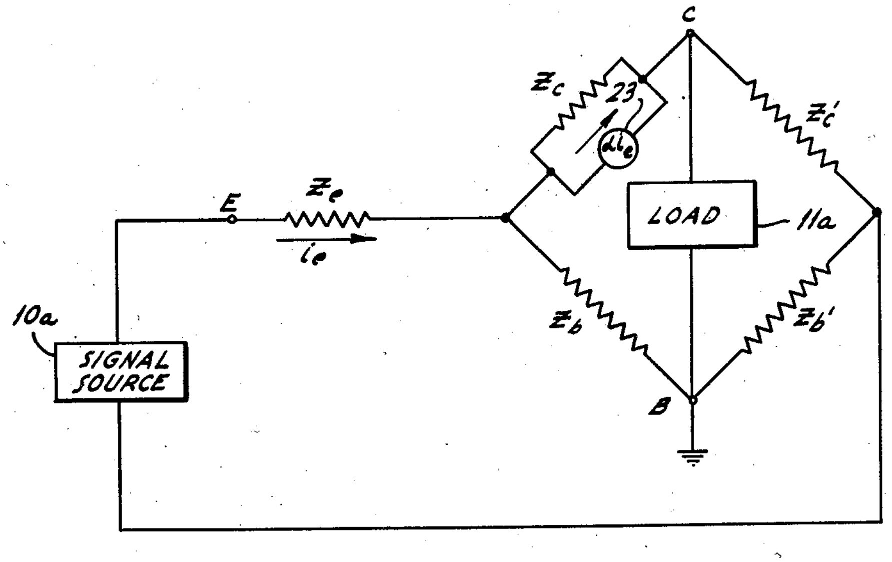

The details of construction and operation of circuits embodying my invention will be better understood from the detailed discussion which follows and from the accompanying drawings wherein:

Figure 1 shows an amplifier circuit which includes a semi-conductor amplifier element and which embodies my invention; and Figure 2 shows the equivalent circuit of the semi-conductor element of Figure 1 and also, in diagrammatic form, the same external circuit connections as are shown for the semi-conductor element of Figure 1.

The amplifier circuit which is shown in Figure 1, to which more particular reference may now be had, is of a basically conventional sort which is suitable for a wide variety of applications. For example, it may serve as one of several stages in the intermediate frequency amplifier chain of a conventional broadcast or television receiver. Among its conventional features are the signal input and output connections which are respectively effected by means of double tuned transformers 10 and 11. The particular tuning adjustment of these transformers depends, of course, on the exact frequencies of the signals which are being amplified and, since these adjustments can be made in well known manner and, in any event, have no bearing on the practice of my invention, they are not further discussed. Input signals derived from any conventional source (not shown), such as, for example, a prior stage of amplification, are supplied to the primary winding of transformer 10 and are transferred by inductive coupling to its secondary winding.

The semi-conductor element 12, to which these input signals are applied has the usual emitter, collector and base electrodes respectively designated by reference numerals 14, 15 and 16. In the particular arrangement shown in Figure 1, the base electrode 16 is grounded, the emitter electrode 14 is connected, through D.-C. blocking capacitor 17, to one end of the secondary winding of input transformer 10 and the collector electrode 15 is connected to one end of the primary winding of output transformer 11. The other end of this primary winding of output transformer 11 is grounded, for alternating signals only, by means of capacitor 18. The collector electrode 15 is also grounded through a second path, paralleling the output transformer primary winding, and including the series combination of a parallel R–C network 19, 20 and of a resistor 21. The other end of the input transformer secondary winding, namely that end which is not connected to the emitter electrode, is connected instead to the junction of the aforementioned parallel R–C network and resistor 21.

The amplifier circuit is completed by the application of suitable D.-C. operating potentials to the semi-conductor element 12. In particular, a conventional source of emitter potential $V_{ee}$ and a conventional source of collector potential $V_{cc}$ may be provided. While the exact values of potential to be supplied by these sources will, of course, depend upon the particular form of semi-conductor element used, typical values are 1.5 volts for the emitter bias and 3.0 volts for the collector bias. In any case, as has been mentioned hereinbefore, the polarity of the emitter potential is made such as to bias the electrode in the forward direction, while the polarity of the collector potential is made such as to bias the electrode in the reverse direction.

As has been indicated previously, a detailed consideration of semi-conductor element operation can be carried out best by reference to its equivalent circuit. It is for this reason that attention is now directed to Figure 2 of the drawings, wherein the equivalent circuit of the semi-conductor element 12 of Figure 1 is illustrated. This equivalent circuit comprises a group of three impedance elements, respectively designated by reference characters $Z_e$, $Z_c$ and $Z_b$, and connected in a Y network. In this network the emitter, collector and base electrodes are respectively represented by the terminals designated E, C and B, and appear at the free ends of impedances $Z_e$, $Z_c$ and $Z_b$ respectively. Each of the three Y connected impedances of the equivalent circuit is, as usual, designated by the name of the electrode with which it is most intimately associated. Thus the impedance $Z_e$ is known as the equivalent emitter impedance, the impedance $Z_c$ is known as the equivalent collector impedance and the impedance $Z_b$ as the equivalent base impedance.

As is the practice in the consideration of equivalent circuits, all components which are involved only in the application of D.-C. operating biases have been omitted from the circuit. On the other hand, those external circuit elements which are involved in the A.-C. operation of the amplifier circuit of Figure 1 have been reproduced in Figure 2, albeit in somewhat simplified diagrammatic form. Thus, the rectangle **11*a*, designated "load" in Figure 2, corresponds to the primary winding of output transformer 11 of Figure 1 and is connected, like the latter, between the collector and base electrodes of the semi-conductor element. The impedance elements designated $Z_c'$ and $Z_b'$ in Figure 2 correspond, respectively, to the R–C network 19, 20 and to the resistor 21 of Figure 1 and are connected, like the latter, in series between the collector and base electrodes. Finally the rectangle 10$a$, designated "signal source" in Figure 2, corresponds to the secondary winding of input transformer 10** of Figure 1 and is therefore shown connected between the emitter electrode and the junction of series connected impedance elements $Z_c'$ and $Z_b'$.

From a consideration of the equivalent circuit of Figure 2 it will be seen that the connection of two separate impedance elements in series between the output electrodes of the semi-conductor element, as in the circuit of Figure 1, has the effect of creating a bridge-like circuit in which the equivalent collector and equivalent base impedances of the element—which are inherent parameters thereof—form two arms, while the two external impedance elements form the other two arms. The load now appears connected between two opposite junctions of this bridge circuit while the signal source, in series with the equivalent emitter impedance, appears connected between the other two opposite junctions of the bridge circuit. Since all the equivalent impedances of a semi-conductor element of the kind under consideration have definite impedance values which can be readily ascertained by conventional techniques involving certain simple short-circuit and open-circuit impedance measurements, it now becomes feasible to balance the bridge circuit under consideration, to any desired extent, by appropriate proportioning of the impedance values of the external impedance elements $Z_c'$ and $Z_b'$. If this balance is made complete then variations in the signal developed across the load 11$a$ will produce no variations at all between the other two bridge junctions. Consequently, output signal variations, in such a balanced circuit arrangement, will produce no signal variations across the series combination of input signal source and equivalent emitter impedance, nor indeed across the input signal source alone. Thus, appropriate selection of the values of the external impedance elements connected between the output electrodes of a semi-conductor element succeeds in reducing feedback to its input terminals to any desired extent.

For substantially complete elimination of this feedback the external impedance elements should have impedance values in the same ratio as the equivalent internal impedances associated with the electrodes to which the external impedance elements are respectively connected. This requirement may be represented mathematically by the expression:

$$\frac{Z_c}{Z_b}=\frac{Z_c'}{Z_b'}$$

It will be noted that I have heretofore concerned myself only with the passive components of the equivalent circuit of a semi-conductor element. It will be understood, however, that this equivalent circuit also includes an active component, conveniently represented by a current generator 23 paralleling the equivalent collector impedance $Z_c$ and productive of a current whose instantaneous value is equal to $\alpha i_e$ where $\alpha$ is an inherent gain factor of the element and $i_e$ is the instantaneous value of the current flowing through the equivalent emitter impedance. Since this current generator appears only in one arm of the bridge circuit under consideration, it unbalances this bridge circuit and causes the appearance, across the load 11$a$, of output signals in response to input signals applied by signal source 10$a$. It will be noted that the current produced by this generator 23 is related to the emitter current in the aforestated manner without regard to the condition of the passive components of the equivalent circuit. This dependence is a phenomenon which transcends the conventional passive circuit relations. However, it will further be noted that there is no reciprocal dependence of emitter current on collector current other than that which is due to the conventional interaction between circuits having certain impedance elements (the equivalent base impedance, in this case) in common. Consequently the balance of the bridge for signals developed across the load remains undisturbed by the presence of generator 23 and no feedback to the input circuit takes place.

It is to be noted that the requirements for feedback elimination have been stated in terms of impedances. This was done to take into account the possibility that the equivalent circuit components of the semi-conductor element, although often treated as resistances, may, under some circumstances, also include reactive components, in which case the external circuit elements provided for the purpose of eliminating feedback in accordance with my invention must also include the appropriate reactive components specified by the aforestated balance requirements.

If the circuit of Figure 1, for example, is used in a television I.-F. amplifier operating at the usual frequencies for such service, namely in the neighborhood of 40 megacycles, then it is found that the equivalent collector impedance is no longer predominantly resistive, as it is at lower frequencies, but is instead predominantly capacitive. In that event, the desired feedback elimination can only be achieved if the external impedance element, which is connected to the collector electrode, also includes a capacitive reactance. This is the reason for the provision of capacitor 20 in parallel with resistor 19 in the circuit of Figure 1. The equivalent base impedance remains resistive even at these high frequencies and the external impedance connected to the base electrode may therefore consist merely of resistor 21.

An unusual feature of a circuit embodying my invention, which is believed to require comment, is that either the source of input signals or the load may be grounded, but not both. The reason for this will become apparent when it is recalled that the load and the input signal source are connected between different pairs of terminals of a bridge network. Since two arms of this bridge, namely those formed by the equivalent impedances of the semi-conductor element, have inherently finite values of impedance, the other two arms must also have finite impedance values if a condition of balance is to be achieved. Evidently finite impedance values between all the terminals cannot be maintained if more than one of them is grounded. This requirement for ungrounded operation of either the input or the output circuit can readily be met in the manner shown in Figure 1, for example, namely by the use of transformer coupling, because transformers operate to transfer alternating signals independently of ground connections.

It will be apparent that my invention is not limited in its application to the particular kind of circuit hereinbefore described in detail. For example, the practice of my invention is equally advantageous irrespective of the particular electrodes of the semi-conductor element to which the input signals are applied or from which the output signals are derived. In any case the connection of two external impedance elements in series between the output electrodes, the selection of these external impedance elements with values which are in the same ratio to each other as the equivalent impedances associated with the output electrodes to which the external impedance elements are respectively connected, and the application of the input signal between the remaining electrode of the element and the junction of the external impedance elements, will result in substantial elimination of feedback from the output circuit to the input circuit of the semi-conductor element.

In general terms, therefore the impedance requirement for feedback may be expressed mathematically by the formula $$\frac{Z_m}{Z_n}=\frac{Z_m'}{Z_n'}$$

where $Z_m$ and $Z_n$ are the values of the equivalent impedances respectively associated with the two output electrodes of the element, $Z_m'$ is the external impedance element which is directly connected to the electrode with which the equivalent impedance $Z_m$ is associated and $Z_n'$ is the external impedance element which is directly connected to the electrode with which the equivalent impedance $Z_n$ is associated.

In view of the wide variety of embodiments of my invention which a person skilled in the art can thus devise I desire the scope of this invention to be limited only by the appended claim.

I claim:

An amplifier circuit comprising: a semiconductor amplifying element having at least emitter, collector and base electrodes, said element having an equivalent collector impedance which may be represented by a parallel resistance-capacitance network and an equivalent base impedance which may be represented by a resistor, said equivalent collector impedance and said equivalent base impedance having absolute values in a predetermined ratio; a parallel resistance-capacitance network connected directly to said collector electrode and connected by way of a resistor to said base electrode, said resistance-capacitance network and said resistor having absolute impedance values in substantially said predetermined ratio; means for applying an input signal between said emitter electrode on the one hand and the junction of said parallel resistance-capacitance network and said resistor on the other hand; and means for deriving an output signal between said collector and base electrodes.

References Cited in the file of this patent

UNITED STATES PATENTS 2,663,766 Meacham ............. Dec. 22, 1953